US012688176B2

(12) United States Patent
Andersen et al.

(10) Patent No.: US 12,688,176 B2
(45) Date of Patent: Jul. 21, 2026

(54) SEARCH AND ANALYTICS ENGINE WITH OBJECT STORE PERSISTENCE

(71) Applicant: Elasticsearch B.V., Amsterdam (NL)

(72) Inventors: Henning Andersen, Silkeborg (DK); Alexandros Batsakis, San Francisco, CA (US); Adrien Grand, Maisoncelles-Pelvey (FR); David Christopher Turner, Otley (GB); Jason Tedor, Avon, OH (US); Tanguy Leroux, Guerande (FR); Timothy Regan Brooks, Denver, CO (US)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 18/907,009

(22) Filed: Oct. 4, 2024

(65) Prior Publication Data

US 2025/0117373 A1    Apr. 10, 2025

Related U.S. Application Data

(60) Provisional application No. 63/587,968, filed on Oct. 4, 2023.

(51) Int. Cl.
  *G06F 16/22*    (2019.01)
  *G06F 12/02*    (2006.01)
  *G06F 16/215*   (2019.01)
(52) U.S. Cl.
  CPC ...... *G06F 16/2272* (2019.01); *G06F 12/0253* (2013.01); *G06F 16/215* (2019.01)

(58) Field of Classification Search
  CPC . G06F 16/2272; G06F 16/215; G06F 12/0253
  See application file for complete search history.

(56) References Cited

U.S. PATENT DOCUMENTS

| | | | | |
|---|---|---|---|---|
| 10,540,227 | B2 * | 1/2020 | Johnson | G06F 12/023 |
| 11,176,034 | B2 * | 11/2021 | Vankamamidi | G06F 12/124 |
| 11,714,724 | B2 * | 8/2023 | Murphy | G06F 11/1451 |
| | | | | 707/646 |
| 11,960,363 | B2 * | 4/2024 | Gupta | G06F 11/1466 |
| 2016/0092496 | A1 * | 3/2016 | Dietterich | G06F 12/0276 |
| | | | | 707/692 |
| 2020/0142878 | A1 * | 5/2020 | Varadarajan | G06F 7/14 |
| 2020/0183906 | A1 * | 6/2020 | Spillane | G06F 16/86 |
| 2022/0391372 | A1 * | 12/2022 | Oliva | G06F 16/2282 |
| 2023/0033773 | A1 * | 2/2023 | Choi | G06F 16/2282 |

* cited by examiner

*Primary Examiner* — Huawen A Peng
(74) *Attorney, Agent, or Firm* — Brake Hughes Bellermann LLP

(57) ABSTRACT

According to an aspect, a search system includes an indexing tier and a search tier. The indexing tier is configured to generate an index structure from a plurality of documents, store the index structure in a local storage device, and transmit the index structure to an external object store, the external object store configured to store the index structure. The search tier is configured to receive a search query from a client device and communicate with the external object store or the indexing tier to retrieve at least a portion of the index structure to search data based on the search query.

20 Claims, 8 Drawing Sheets

400

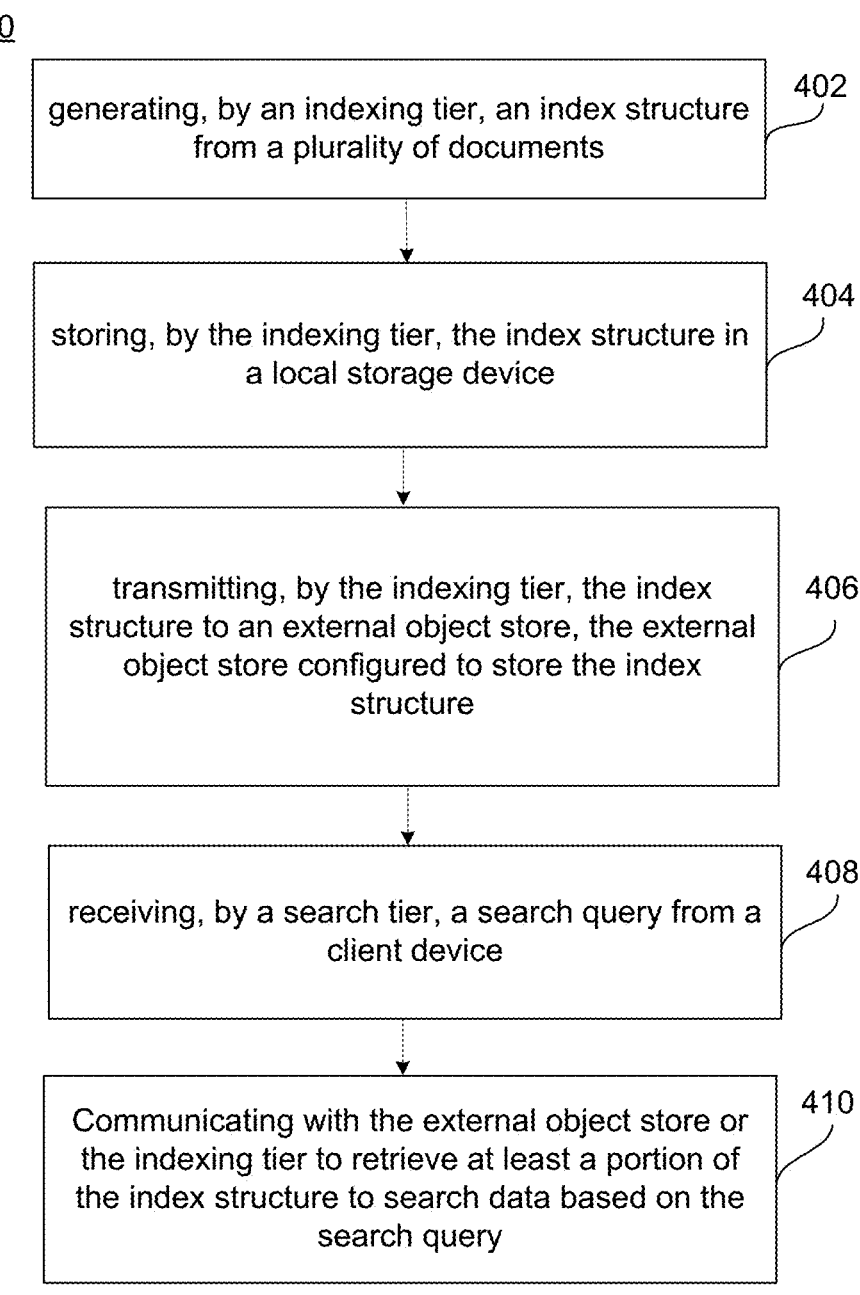

generating, by an indexing tier, an index structure from a plurality of documents  402 storing, by the indexing tier, the index structure in a local storage device  404 transmitting, by the indexing tier, the index structure to an external object store, the external object store configured to store the index structure  406 receiving, by a search tier, a search query from a client device  408

Communicating with the external object store or the indexing tier to retrieve at least a portion of the index structure to search data based on the search query  410

FIG. 4

SEARCH AND ANALYTICS ENGINE WITH OBJECT STORE PERSISTENCE

CROSS-REFERENCE TO RELATED APPLICATION

This application claims priority to U.S. Provisional Application No. 63/587,968, filed on Oct. 4, 2023, the content of which is incorporated herein by reference in its entirety.

BACKGROUND

Some conventional search engines may replicate data between nodes and persist (e.g., store) data on a number of local persistent disks for resilience and durability. However, these conventional techniques may have relatively high hardware costs and may be technically complex to implement.

SUMMARY

In some aspects, the techniques described herein relate to a search system including: an indexing tier configured to: generate an index structure from a plurality of documents; store the index structure in a local storage device; and transmit the index structure to an external object store, the external object store configured to store the index structure; and a search tier configured to: receive a search query from a client device; and communicate with the external object store or the indexing tier to retrieve at least a portion of the index structure to search data based on the search query.

In some aspects, the techniques described herein relate to a non-transitory computer-readable medium storing executable instructions that when executed by at least one processor cause the at least one processor to execute operations, the operations including: generating, by an indexing tier, an index structure from a plurality of documents; storing, by the indexing tier, the index structure in a local storage device; transmitting, by the indexing tier, the index structure to an external object store, the external object store configured to store the index structure; receiving, by a search tier, a search query from a client device; and communicating with the external object store or the indexing tier to retrieve at least a portion of the index structure to search data based on the search query.

In some aspects, the techniques described herein relate to a method including: generating, by an indexing tier, an index structure from a plurality of documents; storing, by the indexing tier, the index structure in a local storage device; transmitting, by the indexing tier, the index structure to an external object store, the external object store configured to store the index structure; receiving, by a search tier, a search query from a client device; and communicating with the external object store or the indexing tier to retrieve at least a portion of the index structure to search data based on the search query.

BRIEF DESCRIPTION OF THE DRAWINGS

FIG. 4 illustrates a flowchart depicting example operations of a search system according to an aspect.

DETAILED DESCRIPTION

This disclosure relates to a search system configured to use an external object store for index replication and storage. For example, the search system may implement and orchestrate a search engine without using internal persistent local disks for index replication and storage. By offloading index replication to an external object store, the complexity of the search system may be reduced since the search system may not replicate data internally. The search system includes an indexing tier and a search tier. The search system may separate ingest operations (e.g., indexing operations) from search operations. For example, the search tier may include computing resources that are separate from the indexing tier. In some examples, the search system includes a controller configured to independently control computer resources of each tier to increase or decrease their respective computing resources (e.g., allocate more CPU and/or memory to the indexing tier when ingesting a relatively large amount of data). The search system discussed herein may reduce the number of local disks (e.g., local storage), reduce computer processing unit (CPU) costs, and may enhance the durability of a search system.

Figure 1A:
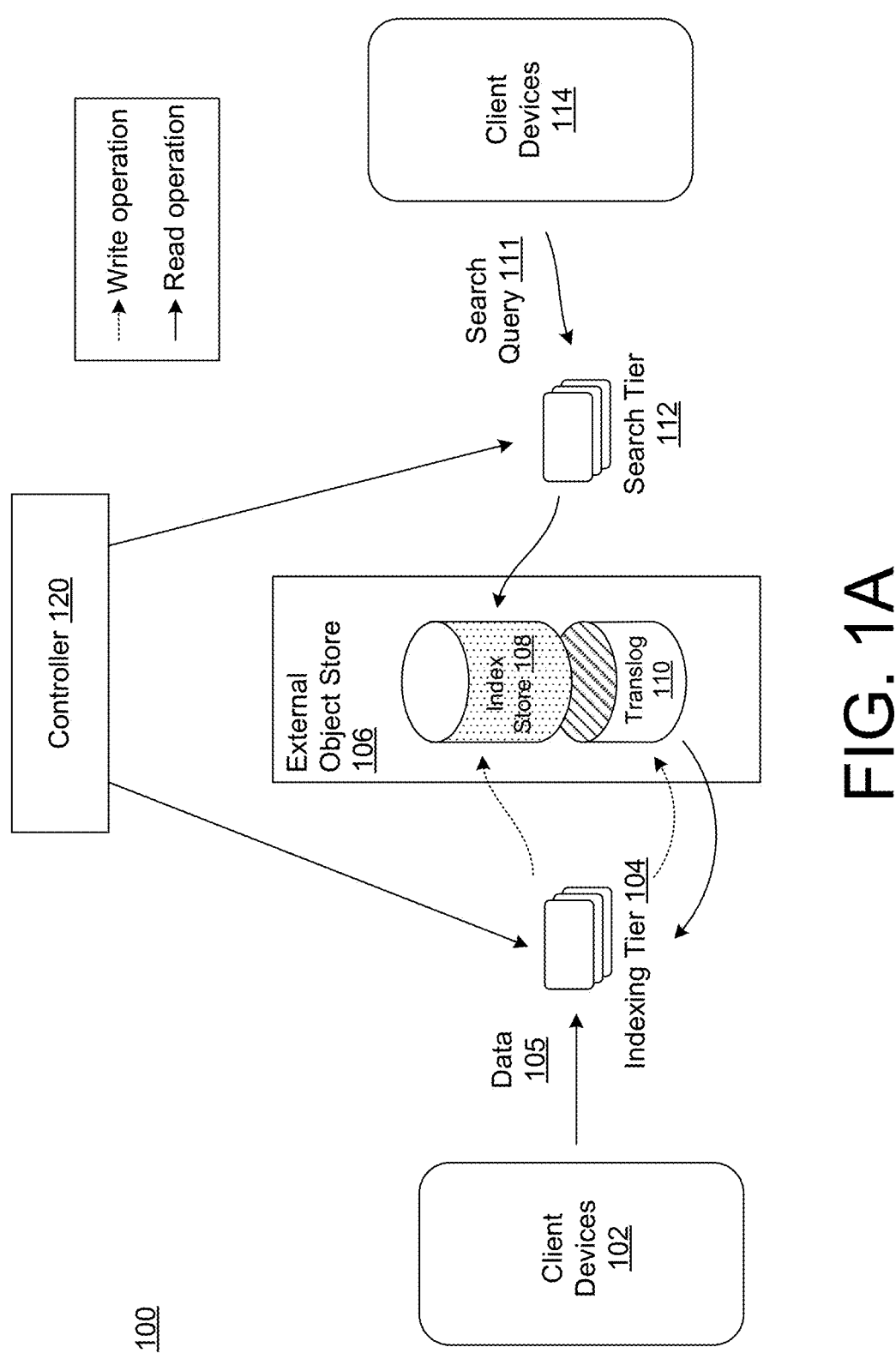
FIG. 1A illustrates a search system for implementing indexing and search tiers that communicate with an external object store according to an aspect.
Figure 1B:
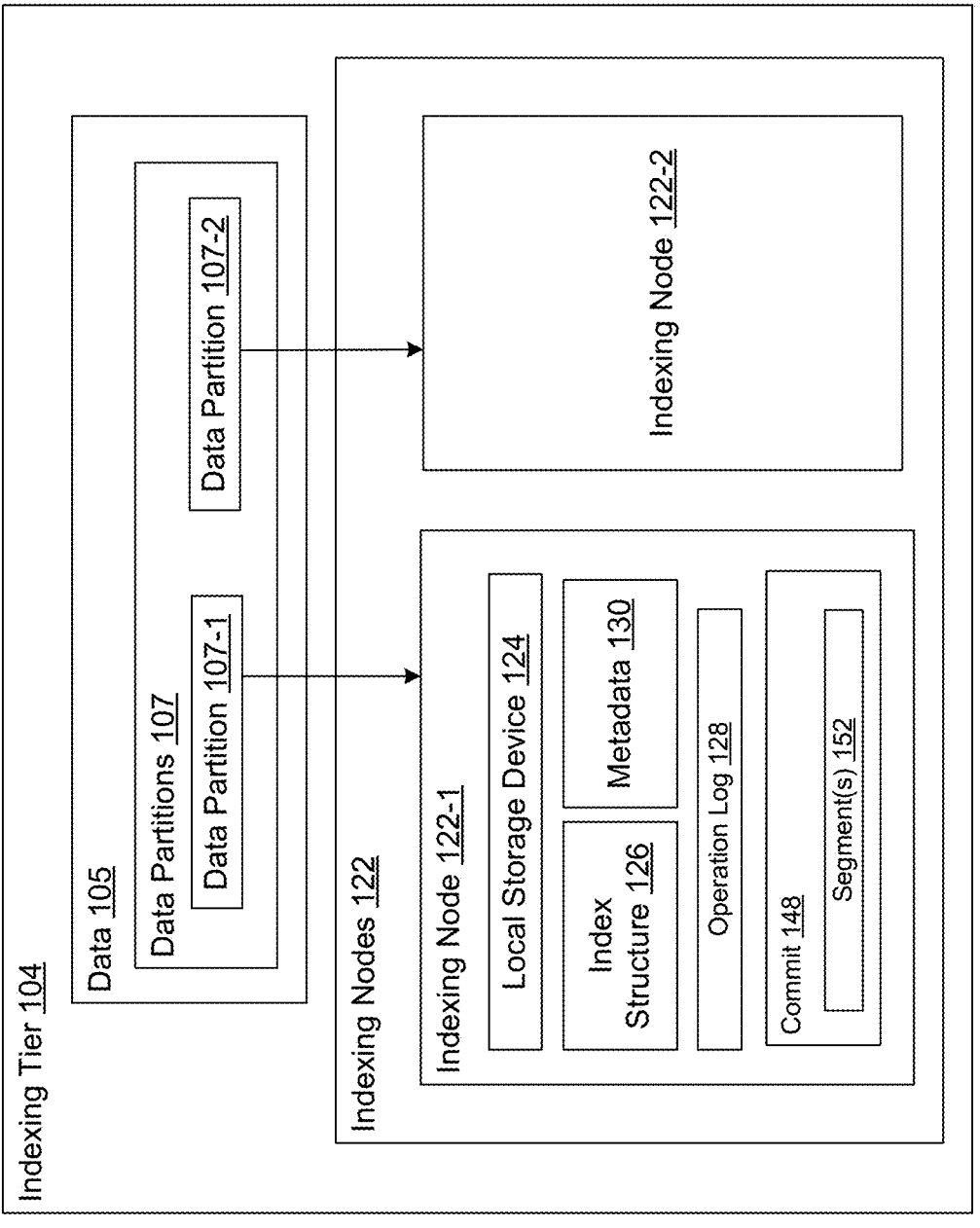
FIG. 1B illustrates an example of an indexing tier according to an aspect.
Figure 1C:
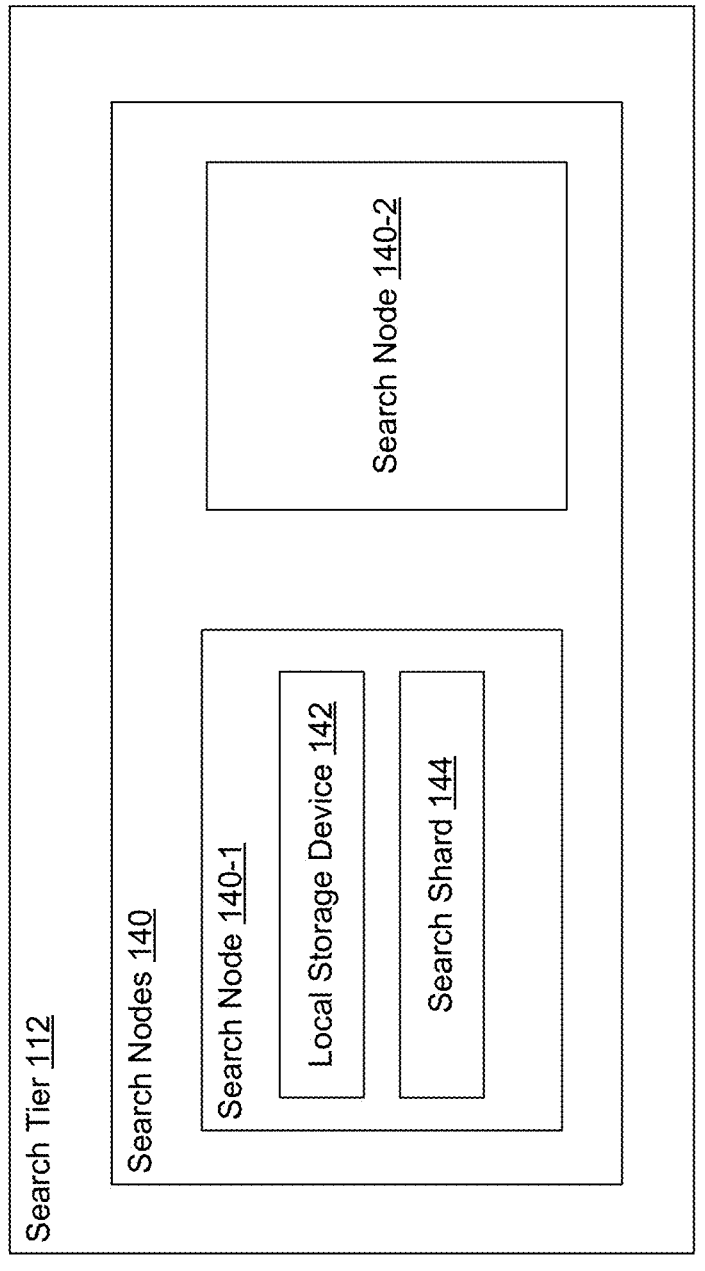
FIG. 1C illustrates an example of a search tier according to an aspect.

FIGS. 1A-1C illustrate an example of a search system 100 according to an aspect. The search system 100 includes an indexing tier 104 and a search tier 112. During data ingestion, the search system 100 may communicate with an external object store 106 to persist data to storage, where the data may include documents, index structures 126 (e.g., including metadata 130 (e.g., cluster metadata, metadata structure, file metadata, etc.)), and operation log(s) 128. In some examples, the external object store 106 may be one or more storage devices that is external to the search system 100. In some examples, the external object store 106 is owned and/or managed by an entity that is different from the entity that owns and/or manages the search system 100. In some examples, the external object store 106 may be referred to as a third-party object store. The external object store 106 may store data 105 as objects (e.g., as opposed to a hierarchical directory structure). In some examples, the search system 100 is a search and analytics engine. In some examples, the search system 100 is an indexing and search engine. In some examples, the search system 100 is an indexing, search, and analytics engine.

In some examples, the search system 100 includes a controller 120 configured to independently size and scale each of the indexing tier 104 and the search tier 112. For example, the controller 120 may independently adjust computer resources associated with the search tier 112 and computer resources associated with the indexing tier 104. In some examples, the controller 120 may increase or decrease the number of indexing nodes 122 based on the amount of data 105 to be indexed in a period of time. The controller 120 may increase or decrease the number of search nodes 140 based on the amount of search queries 111 in a period of time and/or the amount of data to search over in the period of time. The search system 100 may use index structures 126 (e.g., indices), metadata storage, and operation logs 128 to provide real-time data storage, search, retrieval, and/or insertion. In some examples, the search system 100 may be a stateful system. A stateful system is a system that maintains and uses information about its current state in order to function correctly. This information is known as the system's state. A stateful system may store their state to persistent storage so that the search system 100 can be recovered if the search system 100 is restarted or fails. An operation log 128, an index structure 126, and metadata 130 (e.g., cluster metadata, metadata structure, file metadata, etc.) are stored in persistent storage (e.g., the external object store 106), and this information may be used by the search system 100 during a node restart or replacement (e.g., during recovery).

Instead of duplicate index structures across multiple availability zones to provide redundancy in the case of outages, the search system 100 shifts the persistence of this data from local disks (e.g., local storage devices 124, local storage devices 142, etc.) to an external object store 106. By relying on an external service for storing this data, the search system 100 may not perform operations relating to index replication, which may reduce the hardware associated with ingestion. Also, the search system 100 may provide relatively high durability because of the way the external object store 106 replicates data across availability zones.

Offloading index storage to the external object store 106 may allow the search system 100 to separate indexing and search responsibilities. Instead of having primary and replica instances handling both workloads (e.g., indexing and search workloads), the search system 100 includes an indexing tier 104 and a search tier 112, where the search tier 112 is separate from the indexing tier 104. In some examples, the indexing tier 104 includes computer resources (e.g., CPU, memory) that are separate from the computer resources (e.g., CPU, memory) of the search tier 112. Separating these workloads may allow the indexing tier 104 and the search tier 112 to be scaled independently, and hardware selection can be targeted for the respective use cases. In addition, separating these workloads may help overcome technical challenges where search and indexing load can impact one another.

The indexing tier 104 may include one or more indexing nodes 122 (e.g., indexing engines), and an indexing node 122 (e.g., each indexing node 122) includes a local storage device 124 (e.g., a local disk, buffer). In some examples, the indexing tier 104 includes a distributed computing system. In some examples, the indexing tier 104 includes a plurality of indexing nodes 122 such as an indexing node 122-1 and an indexing node 122-2. Although two indexing nodes 122 are depicted in FIG. 1B, the indexing tier 104 may include any number of indexing nodes 122, including any number greater than two. The search tier 112 may include one or more search nodes 140 (e.g., search engines), and a search node 140 (e.g., each search node 140) includes a local storage device 142 (e.g., a local disk, buffer). In some examples, the search tier 112 includes a distributed computing system. In some examples, the search tier 112 may include a plurality of search nodes 140. In some examples, the search tier 112 includes a plurality of search nodes 140 such as a search node 140-1 and a search node 140-2. Although two search nodes 140 are depicted in FIG. 1C, the search tier 112 may include any number of search nodes 140, including any number greater than two.

The indexing tier 104 may receive (e.g., ingest) data 105 (e.g., documents) from one or more client devices 102. In some examples, the data 105 can be referred to as documents. The indexing tier 104 may generate one or more index structures 126 about the data 105 and one or more operation logs 128 about the data 105 and/or the indexing operations. An index structure 126 may be a data structure that includes information about the documents that have been indexed. In some examples, the index structure 126 includes metadata 130 (e.g., cluster metadata, metadata structure, file metadata, etc.). In some examples, the metadata 130 (e.g., the cluster metadata, metadata structure, file metadata, etc.) is separate from the index structure 126. In some examples, an index structure 126 is referred to as an index, a Lucene index (e.g., Lucene files) or segments (e.g., Lucene segments) or a stateless compound commit file. In some examples, an index structure 126 is referred to as an index file. In some examples, an index structure 126 is referred to as an index. The index structure 126 may be used by the search tier 112 to efficiently find the documents that are relevant to a particular query. The type of index structure is dependent upon the type of documents ingested by the indexing tier 104, but may generally include a document identifier, document type, timestamp, index terms, ranking, etc.

In some examples, an operation log 128 may be referred to as a translog. In some examples, an operation log 128 may be referred to as a shard operation log. The operation log 128 may be stored (e.g., temporarily stored) as a file in the local storage device 124 and transmitted to the external object store 106 to be replicated and stored. An operation log 128 may be a type of database log that records changes (e.g., all changes) to a database and may be used to replicate changes from one database to another. An operation log 128 may include information about the operation (e.g., adding a document to the index, deleting a document from the index, etc.), indexing status, error message, and/or fields (also referred to as document fields) such as document timestamp, document type, and/or document identifier, etc. In some examples, as shown in FIG. 1B, the indexing tier 104 may partition the data 105 into data partitions 107 (e.g., data partition 107-1, data partition 107-2), and each indexing node 122 may process a respective data partition (e.g., sub-set of the data 105) to generate an index structure 126 (e.g., an index structure per partition) and an operation log 128. For example, an indexing node 122-1 may process a data partition 107-1 to generate an index structure 126 (and an operation log 128), and an indexing node 122-2 may process a data partition 107-2 to generate another index structure 126 (and another operation log 128). The indexing tier 104 may temporarily store the index structures 126 and the operation logs 128 in local storage devices 124. In some examples, the indexing tier 104 may increase the efficiency for ingesting data by removing the duplication of indexing operations for a replica (e.g., every replica).

The indexing tier 104 may communicate with an external object store 106. In some examples, the external object store 106 is an external (e.g., third-party service) that can persist the data and the indexing information. The external object store 106 includes an index store 108 and an operation log store 110. In some examples, the indexing tier 104 may execute indexing operations (e.g., CPU-intensive indexing operation) once (e.g., only once).

The indexing tier 104 may transmit the index structures 126 and the operation logs 128 to the external object store 106, where the index store 108 stores the index structures 126 and the operation log store 110 stores the operation logs 128. In some examples, the search tier 112 may read information from the index store 108. In some examples, the search tier 112 searches against mutating information in the index store 108. In some examples, the indexing tier 104 may retrieve (e.g., periodically retrieve) the index structures 126 and the operation logs 128 from its local storage device(s) 124, and then transmit the index structures 126 and the operation logs 128 to the external object store 106. In some examples, the search system 100 may delete the index structures 126 and the operation logs 128 (or a portion thereof) from its local storage devices 124. In some examples, the indexing tier 104 may transmit the actual data (e.g., the documents) to the external object store 106 for data persistence.

The external object store 106 may execute replication operations on the index structures 126, the operation logs 128, and the data, so that the data is stored (e.g., persisted) in multiple physical copies in different data centers (e.g., also referred to as availability zones). In some examples, the search system 100 may improve storage costs on the indexing tier 104 by reducing the amount of data that must be stored on a local disk. In contrast to some conventional approaches that store a full shard copy (e.g., a copy of the full index structure) on hot nodes (e.g., both primary and replica) for indexing purposes, the search system 100 may use the external object store 106 for indexing (and replication) storage and use local disks for storing a relatively small amount of metadata and partial data, which may reduce the reduce the local storage required for indexing.

Once stored at the external object store 106, the data is ready to be used (e.g., consumed as-is) by the search tier 112. For example, in response to a search query 111 from a client device 114, the search tier 112 may communicate with the external object store 106 to search the index structures 126 for the documents that are responsive to the search query 111. In some examples, the search tier 112 may retrieve a portion of the data (e.g., index structure(s) 126, data 105) stored at the external object store 106 and store the portion of data in a local storage device 142, which can increase the speed of obtaining search results. In some examples, the CPU cost associated with retrieving data from the external object store 106 may be lower than some conventional approaches that index the data and store (e.g., write) the data locally. In some examples, the search tier 112 may be enabled to dedicate their CPU power (e.g., dedicate their entire CPU power) to search.

In some examples, the indexing tier 104 may cause operation logs 128 (e.g., shard operations logs) to be included in a file (e.g., single, possibly compressed file), and the file (e.g., operations file) is transmitted to the external object store 106. The file may include operations (e.g., all operations) written by an indexing node 122 (e.g., a single node) of the distributed cluster. The files may be sized based on inbound indexing throughput and amortized indexing intervals to single object store puts. Optimizing the sync interval may be beneficial to introduce cost savings in face of expensive blob store application programming interface (API) costs. The operation log 128 may be rolled over and pruned as the operations are indexed into the index structures 126 and written to the external object store 106 as part of the search indices.

In some examples, a search node 140 includes or is associated with a search shard 144 (e.g., an allocated search shard) that can search over a shard (e.g., a mutable shard) in the external object store 106. A search shard 144 is an allocation of the shard to a search node 140 that can handle searches against that shard. A shard is a partition of an index structure 126, or, in some examples, the index structure 126. In some examples, a mutable shard is a shard that can receive updates, deletes, appends, and/or inserts.

As indicated above, the metadata 130 may include a metadata structure (e.g., a persistent custom metadata structure), which is transmitted to the external object store 106 and stored in the external object store 106. In some examples, the metadata structure may allow search data to recover from commit points (e.g., Lucene commit points). The metadata structure may include a directory of the location of files referenced from a commit point (e.g., a structure associating files with their locations). In some examples, the search system 100 uses compound commit files, which contain files inside them, and the metadata structure is used to locate every file (e.g., name of compound commit file containing the file as well as the offset and/or length of the file).

A commit point may be a snapshot of the index structure at a specific point in time. In some examples, a commit point is a file that contains information about the segments that are part of the index structure. The metadata structure may allow a shard (e.g., at least a portion of the index structure) to be recovered (e.g., fully recovered) for searching. A segment is a self-contained index that contains a subset of the documents in the overall index structure.

In some examples, an indexing node 122 may create (e.g., generate) segments when the index structure 126 is stored on the local storage device 124. When a new commit is received, the search shard (e.g., a search node 140) of the search tier 112 may download (e.g., retrieve) the metadata structure from the external object store 106. The search node 140 may use the metadata structure to search (e.g., immediately search) shards files stored in the external object store 106. A search shard file is a file that includes a partition of an indexing structure, or, in some examples, the indexing structure that is used by a search node 140. The local storage device 142 (e.g., a local disk) may exist (e.g., may only exist) as a local cache and the local cache can be populated on-demand or speculatively from the external object store 106. This may reduce local hardware costs as the external object store 106 can be the persistent storage for all data while local disks may cache (e.g., only cache) the data required to search. In effect, search nodes 140 with only a limited amount (e.g., gigabytes) of local storage can search across a large amount of data (e.g., terabytes, petabytes, etc.) of data in the external object store 106.

In some examples, the search system 100 uses partially cached index files for storage savings. For example, instead of storing the full set of index structures in the local storage devices, in some examples, the indexing tier 104 may store a portion of the index structures 126. The indexing tier 104 can retrieve additional information (e.g., on demand) from the external object store 106. For example, data is first indexed and written locally by the indexing tier 104, then uploaded to the external object store 106, and pruned from the local storage device 124 (e.g., local disk) as it is no longer needed. This allows fewer local hosts and/or less local disks to be able to index, update and delete the full data set.

In some examples, the search system 100 may store cluster metadata in the external object store 106. The cluster metadata includes information (e.g., global information) about the search system 100. In some examples, the cluster metadata includes information for nodes of the search system 100 (e.g., the search nodes 140 and/or the indexing nodes 122). In some examples, the cluster metadata includes information about the list of indices, their settings, fields and types of fields, cluster-wide settings, and/or index templates, etc.

In some examples, the search system 100 causes the external object store 106 to store the cluster metadata using atomic operations. In some examples, the cluster metadata is stored at the index store 108. In some examples, using atomic operations, an elected master (e.g., one of the indexing nodes 122 of the indexing tier 104) may write (e.g., safely write) the metadata (e.g., the cluster metadata) to the external object store 106 for storage. As a distributed system can have multiple nodes competing to be the current master (or leader), the search system 100 may allow all such master eligible nodes to decide on a single node that is considered the current master (or leader) of the cluster. In some examples, by storing the cluster metadata at the external object store 106 and performing the leader election at the external object store 106, the search system 100 may reduce (e.g., eliminate) the amount of local persistent storage for maintaining cluster wide metadata and performing distributed consensus.

In some examples, the search system 100 may provide technical solutions for deleting files in the external object store 106 when files reside in the external object store 106. A primary indexing shard is an allocation of a shard to an indexing node 122 and that allocation is the primary for the shard (e.g., that indexing node 122 will handle all writes to the index store 108). In some examples, the search system 100 uses the external object store 106 to store a relatively large amount of data, but in order to reduce storage costs at the external object store 106, the search system 100 may cause the external object store 106 to delete certain types of data, which may be no longer required by the search system 100. In some examples, the external object store 106 may store files (e.g., index structures 126), operation logs 128, and cluster state files. In some examples, the files are Lucene files. The indexing shards (e.g., an indexing node 122 of the indexing tier 104) may create files that are transmitted (e.g., uploaded as single blobs) to the external object store 106 (e.g., under the indices prefix). The operation logs 128 may be transaction compound files, which include recent concurrent transaction operations from an indexing node's shards. The cluster state files may represent the cluster metadata and may include other files used by stateless masters.

Indexing shards (e.g., indexing nodes 122 of the indexing tier 104) generate segments 152 (e.g., Lucene segments) that are regularly committed and uploaded to the external object store 106. In some examples, a segment 152 may be referred to as a segment file. In some examples, an indexing shard is an allocation of the shard to an indexing node 122 that executes indexing operations on a partition of an index structure 126, or, in some examples the index structure 126. As indicated above, a shard is a partition of an index structure 126, or, in some examples, the index structure 126. To improve storage (e.g., optimize storage), reduce API costs and/or decrease latencies, segments files (e.g., segments 152) may be grouped (e.g., packed together) as a stateless compound commit (e.g., a single blob) (e.g., also referred to as a commit 148). A commit 148 (e.g., a stateless compound commit) (e.g., every stateless compound commit) may include one or more new files and can also reference files that have been created by a previous commit or files that are not contained in a stateless compound commit.

Stateless compound commits (e.g. commits 148) and other index files may be stored in the external object store 106 under a prefix (e.g., the indices/<index uuid>/<shard id>/<primary term>/prefix) and files committed under a primary term (e.g., a primary term N) can also be committed under a newer primary term (e.g., a newer primary term N+1). Stateless compound files may include a header with the list of files (e.g., a complete list) of the commit 148 and their location in the external object store 106 (e.g., blob store), along with the starting translog compound file to recover operations from.

The search system 100 may delete a stateless compound file from the external object store 106 when the files (e.g., all files) it includes have been deleted (i.e., are not part of a more recent commit 148). In some examples, the commit 148 (e.g., a stateless compound commit) is not used by an indexing node 122 or a search node 140, and/or the commit 148 (e.g., a stateless compound commit) is not the most recent commit 148. The search system 100 may delete files that are not contained in a commit 148 (e.g., a stateless compound commit) if transmitted (e.g., uploaded) separately) from the external object store 106 when the file has been deleted (e.g., is not part of a more recent commit) and/or the file is not used by a node (e.g., an indexing node or a search node) (e.g., is not part of a commit used by the node).

In some examples, when an index structure 126 is deleted, a universally unique identifier (UUID) directory (e.g., the whole index UUID directory) may be deleted after all indexing shards (e.g., shards on indexing nodes 122 of the indexing tier 104) and searchers (e.g., searches on search nodes 140 of the search tier 112) are terminated (e.g., closed).

With respect to translog compound files, each node (e.g., an indexing node 122) may store translog compound files in a directory with a node identifier (e.g., its node ephemeral identifier). Each translog compound file may include a header (e.g., a compound-translog-header), which may include a shard identifier mapping (e.g., Map<ShardID), shard metadata (e.g., TranslogMetada>metadata), followed by the operations of each shard identifier. The shared metadata for each shard may include the minimum and maximum sequence number of the operations inside the compound file. Also, each indexing shard's latest statement compound commit file has a header with the node identifier (e.g., nodeEphemeralID) and a recovery parameter (e.g., translogRecoveryStartFileInteger), to indicate which translog compound file to start reading operations when recovery of the index shard is initiated. In some examples, the search system 100 may cause a translog compound file to be deleted from the external object store 106 if there is no indexing shard that will need the file for recovery.

With respect to cluster state files, a cluster state file may include a cluster state, a lease file, and heartbeat. The lease file includes the current term, which is increased atomically when a master changes term or takes over from another master. The numbered directories signify the cluster state of that term. A master node (that takes over first) updates the lease file and then uploads the cluster state. Assuming a master node takes over the current term N, the previous term folders (less than N) can be deleted after the master node has transmitted (e.g., fully uploaded) the cluster state of term N.

The search system 100 may use one or more deletion strategies, e.g., when, and how to delete the files from the external object store 106. In some examples, the search system 100 (e.g., indexing tier 104 and/or the search tier 112) uses an active deletion strategy. The active deletion strategy may involve delegating the deletions directly to the components that create the files in the first place. In some examples, the active deletion strategy may enable the deletion of files quickly (e.g., as soon as possible). Also, the search system 100 may perform load balancing on the respective components (e.g., the indexing shards) for deleting files.

The search system 100 may cause an indexing shard (e.g., an indexing node 122) to delete files (e.g., older files) each time the indexing shard deletes a commit 148. For example, when the indexing shard deletes a commit 148, the indexing shard can determine and delete any older unnecessary stateless compound commits 148 in the external object store 106. For translog files (e.g., operation logs 128 stored in the operation log store 110), deletions may be executed by the indexing node 122. Once a new stateless compound commit file is created, the indexing node 122 may check whether any older translog compound files that potentially exist on the external object store 106 can be deleted (e.g., safely deleted), and, if so, may delete the translog compound files. For cluster state files, deletions may be executed by a stateless election strategy component. Once a node becomes the master of the new lease term, the stateless election strategy component may delete any folders of previous lease terms.

In some examples, the search system 100 uses master garbage collection, which may involve having an automatically re-scheduled background task (or three tasks, one per files category below) that examines files in the external object store 106 to check which files can be safely deleted, and, if so, deletes them. The task can be on the master node or can run on any other node. In some examples, the search system 100 may examine indices to check whether any older stateless compound commits that potentially exist on the external object store 106 can be safely deleted, and, if so, may delete them. For translog files, the search system 100 may check whether any older translog compound files that potentially exist on the external object store 106 can be safely deleted, and, if so, may delete the translog compound files. For cluster state files, the search system 100 may delete any previous lease terms folders older than the current master lease term.

In some examples, the search system 100 uses a combination of active deletion and garbage collection strategies. In some examples, the search system 100 may primarily use active deletion, so that files can be deleted as early as possible, and to load balance deletions across different nodes. However, the search system 100 may use a garbage collection background task in some cases to ensure deletion of possible leftover files.

The background task may be automatically scheduled every X period of time (e.g., 30 minutes) (configurable setting). The background task may search, and issue deletes for unnecessary files in all three categories. The task may be active only on the master (and may be canceled if it is not the master anymore) or it may run on any other node. For deleting translog compound files, active deletion may occur within each node. In some examples, the search system 100 uses the active deletion strategy for translog compound files. In some examples, an indexing node of the search system 100 may maintain an internal map of references between allocated primary indexing shards and the translog compound files they reference. When the last reference is removed, the translog compound file is eligible for deletion.

Specifically, for each shard, the search system 100 may maintain an ordered list of the translog compound files (their ordinals) that it references, which is updated upon every added translog. The search system 100 may maintain a map from each translog compound file ordinal that the system creates to an atomic reference counter, which is initialized with the number of shards contained in the compound file. Whenever a shard commits, the search system 100 determines the new starting recovery translog compound file ordinal, and the search system 100 looks into its list for all the previous ordinals. For each previous ordinal, the search system 100 may decrease the respective atomic reference counter of the map. If a counter hits zero, the search system 100 may issue a delete for that file ordinal, provided the indexing node is still the owner of affected shards, or those shards are successfully recovered elsewhere.

In some examples, if a node dies/restarts, it may have a new ephemeral node identifier. The old folder will be a leftover folder. The search system 100 may execute a persistent task (so it's not run only on the master node) that may listen to cluster state updates for nodes removed and delete their ephemeral node identifier directories when it is safe to do so. In some examples, there may be unassigned shards or recovering (from scratch, rather than relocating) primary indexing shards that could be using the translog of that dead node. To avoid deleting those files, the search system 100 may cause deletion of dead nodes' folders if (e.g., only if) the cluster has successfully recovered affected indexing shards elsewhere in the cluster.

For deleting index commit files, the search system 100 may use active deletion within each indexing shard. The indexing shard may be responsible for tracking existing stateless compound commits in the external object store 106 and for deleting them once they are not used anymore. To safely delete unused blobs (e.g., commits), the indexing shard may maintain an in-memory list of all existing commits. This list may be initialized when the indexing shard starts to recover existing stateless compound commits from the external object store 106.

The search system 100 may identify, from pending deleted stateless compound commits 148, the files that can be deleted, starting from the oldest compound commit marked as deleted (e.g., lowest generation). If the commit 148 is not used by shard copies (e.g., a node with an allocated index structure or portion thereof), the search system 100 can compare the commits 148 referenced by the compound commit with the commits 148 referenced by the next compound commit generation and extract the list of commits 148 to delete. The indexing shard may check that it is still the indexing shard (e.g., with master) before proceeding with the deletion. The indexing shard may receive information from search shards on active searchers to determine which commits 148 are still in use by the search nodes. This information may be passed during commit notification from indexing shard to search shard. When an index is deleted in the cluster metadata, each indexing shard can also initiate the deletion of the files on the external object store 106 when the search system 100 determines it is safe (e.g., after all shards and searchers are closed).

In some examples, the search system 100 uses garbage collection for leftover folders. There may be an edge case of a leftover index directory when an index is deleted, and the node terminates (e.g., dies) before issuing the deletion of the corresponding directory of the external object store 106. The background task on a master node (or a persistent task that can run on any node, if possible) can list all indices UUID folders on the external object store 106 and may compare with the cluster state. In some examples, any non-referenced UUID could be considered leftover and deleted. In some examples, the search system 100 may delete cluster state files. After fully uploading the cluster state, it deletes numbered directories (e.g., all numbered directories) (and their contents) before its term. In some examples, the search system 100 may relocate indexing shards. The search system 100 may support graceful relocations of indexing shards. In some examples, a graceful relocation may mean that the cluster does not reject any indexing operation at one or more points (e.g., any point) in the relocation process.

In some examples, the search system 100 may use operations-based relocation. In some examples, the search system 100 may adapt the existing operations-based peer recovery process to work with primary indexing shards. In some examples, the search system 100 uses segment-based relocation. The relocation source may block and drain operations (e.g., all operations), perform a final flush, and wait for the target to download parts of a last flush before releasing the operation block. In some examples, the search system 100 may limit segment sizes created during relocation. In some examples, it is assumed that each commit is not different (e.g., significantly different) from the previous one. In some examples, the latest commit may change (e.g., change significantly) if the latest change includes the results of a merge operation, because a merge operation may produce new segments, and, by default, each new segment has a size up to a threshold level. The search system 100 may temporarily block merge operations, or constrain merge operations to smaller segments, which may avoid creating commits with relatively significant changes.

In some examples, the search system 100 may limit data needed on a new primary. The new primary may not retrieve (e.g., download) the commit (e.g., entire commit) before it can start accepting indexing operations. In some examples, append-only indexing can create new segments without access to earlier ones. More generally, the new primary may use data from an old primary, and delegate tasks (e.g., identifier lookups) while the download is occurring (e.g., ongoing).

With respect to an index structure, in some examples, index and delete operations are added to the index structure before being written to the translog (but, in some examples, may not be durably stored in the external object store 106). In order to increase the durability of the operations and to quickly acknowledge the operation back to the client, the translog is persisted to the external object store 106 before the operation is acknowledged back to the client.

A search engine library may maintain a set of indexing buffers in memory that contains the documents to add (or to delete) in the index. When those indexing buffers consume a given amount of memory, the search system 100 flushes the buffers as files to the disk and clears out the buffers. This process may be referred to as a flush (e.g., flush operation) and the newly created set of files composes a segment. In some examples, the flush operation is a Lucene flush. In some examples, the segment is a Lucene segment. At this stage, the segment can become searchable but its files are not yet synchronized to disk and therefore may not be durable. Persisting the segment files on disk is a process (e.g., an expensive process) called a commit (e.g., a commit operation). In some examples, the commit operation is a Lucene commit. The commit operation may include synchronizing on disk each file of each segment not yet committed before writing a segment info file. This segment info file may include a monotonically increasing generation number, the list of all active segments that compose the commit and other various metadata. The search system 100 may retain the most recent commit, but the search system 100 may retain older commits for specific purposes like snapshotting or Point-In-Time searches.

As indexing occurs and more and more segments are created, the search engine library can decide to merge multiple small segments into a single, more optimized one. This process is called a merge (e.g., a merge operation) and may occur concurrently with indexing (at least partially). In some examples, the merge operation is a Lucene merge. In some examples, a merge operation is usually followed by a commit to make the new segment durable and to free up some disk space by deleting the merged segments. In some examples, the Refresh API can be used to execute a flush operation and a flush API executes a commit (e.g., a commit operation). A merge operation can also be triggered explicitly.

With respect to the index structure stored at the external object store 106, in some examples, the index files may be persisted on an external object store 106 after every commit operation. In some examples, the search system 100 may explicitly trigger a commit operation every X seconds (e.g., 5 seconds) (e.g., a configurable delay), without waiting for the indexing buffers to be filled up or waiting for a flush-on-idle to occur (e.g., after 5 minutes with no indexing).

In some examples, the search system 100 may start uploading (e.g., transmitting) files in response to a commit operation (e.g., right after the commit operation). This way the commit is successful in the search engine library before uploading the files, and the search system 100 may have a complete representation of the files (in terms of lengths and final names) to optimize the upload. In some examples, files of merged segments may be uploaded once the merge operation is completed but not yet committed. In some examples, the search system 100 may commit when they are fully uploaded to the external object store 106. In some examples, the search system 100 may avoid synchronizing files on the local disk(s) for better performance.

In some examples, index-level metadata files may be stored at the external object store 106. The index-level metadata files may store index-level metadata, which may include information about a configuration of an index, including settings and fields. In some examples, the index-level metadata may be included as part of the cluster metadata. In some examples, the index-level metadata files may be stored using a prefix (e.g., the/indices/<index-uuid>/ prefix) with object names. Files of shards may be stored in the external object store 106 (e.g., the object store bucket (or container)) using a prefix (e.g.,/indices/<index-uuid>/ <shard-id>/prefix). Using a universally unique identifier (UUID) as the prefix for object names may be beneficial for throttling and performance. In some examples, indexing shards may avoid overwriting existing objects when uploading local segment files to the external object store 106. This can happen, for example, when an isolated indexing shard is uploading new segments and/or is initiating a merge operation before being demoted.

In some examples, the search system 100 may use primary term prefixes for object names. The index files can be uploaded as objects prefixed by the primary term, which may ensure a clean separation of files uploaded by different indexing nodes for the same shard. In some examples, the search system 100 may use identifiers (e.g., random UUIDs, numbered files, or other identification scheme) for object names to avoid name clashes. For example, the index files can be uploaded as objects with identifiers (e.g., random UUID names, increasingly numbered files). In some examples, a mapping of file names is maintained.

Stateless indexing shards may retain an in-memory map of files (e.g., all files) with their corresponding UUIDs in the external object store 106. This map may also keep track of the state of files (uploaded, deleted, renamed etc.) as well as the highest segment generations they belong to (this may be useful later for pruning objects). Using UUIDs as object names may be useful to avoid conflicts in object names in case an indexing shard allocated to a node that is isolated (e.g., network-wise) from the rest of the cluster is uploading new segments/is kicking off a merge before being demoted. UUIDs may help for snapshotting in the future.

The search system 100 may implement one or more recovery techniques relating to searching shard recovery and indexing shard recovery. With respect to searching shard recovery, a search shard (e.g., a search node) may be able to recover the index structure by communicating with (e.g., reaching out to) the indexing shard (e.g., an indexing node) for the latest segment generation number and/or, the list of files. The files may then be retrieved (e.g., downloaded) (e.g., on demand) from the index store 108 as partially cached files. Another solution is to recover the searching shard by listing the objects matching the prefix (e.g.,/ <index-uuid>/<shard-id>/<primary-term>/segments-prefix) from the index store 108 and then by reading the one with the highest generation number. In some examples, the searching shards receive (or subscribe to) notifications for newly uploaded segments from the indexing shards. Searching shards may also keep informed the indexing shard of their respective segment generations (this could be implemented in the response of segment uploads notifications).

With respect to indexing shard recovery, indexing shards may recover from the index store 108 by listing the objects matching the prefix (e.g.,/<index-uuid>/<shard-id>/prefix) determining the latest commit primary term and generation. With the latest compound commit metadata, the search system 100 may be able to create a new index locally. Files may be downloaded partially from the external object store 106 and stored locally (e.g., in a local storage device). In some examples, files may be retrieved (e.g., downloaded) (e.g., on demand) from the external object store 106 as partially cached files. Once the index (e.g., the index structure) is created, translog files (e.g., operation logs) may be retrieved (e.g., downloaded) from the operation log store 110 and operations are replayed. In some examples, the speed of the recovery process is increased by the partial caching of the index files.

In some examples, the search system 100 may implement thin indexing shards. Thin indexing shards may locally store the data (e.g., only the data) required for indexing, and local memory space may increase when segment files are uploaded to the external object store 106. Any files later required for indexing may be fetched on demand from the external object store 106 as partially cached files. In some examples, the search system 100 can implement thin indexing shards by deleting committed segment files locally when they are uploaded to the index store 108.

In some examples, the search system 100 may write new segment files directly in the cache and rely on the cache eviction to increase memory space. In some examples, the search system 100 may write new segment files to a separate temporary area first until those are uploaded to the external object store 106. In some examples, the search system 100 may increase an indexing and search shard startup speed. Bootstrapping (e.g., generating, initializing) a new searching shard or recovering a failed indexing shard (e.g., an indexing node that failed or a failed indexing node) requires a search engine library to fully read the latest segments info file (segments_N), to fully read the segment info (.si) of every segment and then to verify all other files before opening the index. The majority of data can then later be fetched on demand instead of upfront.

In some examples, the search system 100 may aggregate bits (e.g., all the required bits) to open and verify an index into a single file available in the index store 108. With a unique download, a shard may receive all headers and footers of all files of all segments. This file may be generated and uploaded prior to the next commit or as part of a commit. In some examples, the search system 100 may implement a transmission sequence for transmitting (e.g., uploading) segment files (e.g., fully upload segment_N before starting uploading segment_N+1). Large files may benefit from concurrent multipart uploads. In some examples, the search system 100 may implement a throttling mechanism to decrease the speed at which they are transmitted. In some examples, the search system 100 may track total time spent uploading objects, total time spent downloading objects, object upload/download/deletion/retries counters, and/or active segment generations.

The transaction log may be a log file where operations can actively be written as indexing occurs. If an operation needs to be accessed before it is visible for a search it can be read from the transaction log. Additionally, in case of a failure operations can be replayed back from the transaction log on a restart or for a peer recovery.

In some examples, the search system 100 may implement stateless translog replication. In order to provide safety, the search system 100 may implement a method of writing the translog to a persistent store (an external object store 106) to increase safety (e.g., guarantee safety). In some examples, the search system 100 may use translog replication. By storing the translog (e.g., the operation log) to the external object store 106, a stateless recovery may read the translog in order to perform recovery.

The transaction log may have an object store layout, where each node may have a location on the external object store 106 for a list of incrementing translog replica files (e.g., Node-ephemeral-id/with translog 0, translog 1, translog 2, translog 3, etc.). A translog replica file may store compressed or uncompressed file metadata. In some examples, the translog replica file may store the file metadata at the beginning of the file. The file metadata may include metadata byte length, byte offset per shard contained and/or other metadata. In some examples, following the file metadata, the translog replica file may store compressed translog information (operations).

In some examples, the external object store 106 may store the file metadata. For example, the external object store 106 may allow file metadata to be associated with files, which, in some examples, can be used for storing some or all of the translog metadata. Reading the file metadata may count as a get operation (e.g., a "get") from a cost perspective, but, in some examples, reading the file metadata may reduce bandwidth. In some examples, the search system 100 may mark each translog replica files with indexing shards stored in them, which may allow recoveries to fetch data (e.g., only fetch data) from translog replica files relevant to them.

In some examples, when an operation is added to the translog, the search system 100 may add the operation to the current in-memory stream of operations. This stream can be compressed as the stream is transmitted. In some examples, the stream is compressed when certain byte thresholds are achieved. When the total in-memory buffered operations across all translog files satisfies a specific threshold, a storage operation (e.g., PUT) to the external object store 106 is scheduled. In some examples, the data may be combined between all of the translog files from shards located on the same indexing.

In some examples, translog files may be written to the external object store 106 in parallel (e.g., at least partially in parallel). In some examples, translog 3 may be transmitted to the external object store 106 before transmitting translog 2. In some examples, the search system 100 may ensure that a recovery does not skip translog files that are not yet available and the search system 100 may not acknowledge operations in translog 3 until translog 2 has also been successfully synced. In some examples, the search system 100 may set lower timeouts on writes to the external object store 106 to ensure that slow requests are retried quickly. In some examples, get operations from the translog may be read from the local translog files. In some examples, get operations from the translog may be read from the external object store 106. In some examples, the search system 100 may use caching to improve performance of get operations.

In some examples, on either a recovery or a relocation, a node may recover in the same manner. The search system 100 may list the translog replica files on the external object store 106 from the latest known identifier (e.g., ephemeral node ID) for the shard. The search system 100 may retrieve (e.g., fetch) the first section of the file and attempt to read the file metadata from the header section. If the translog replica file is relevant for the shard it is attempting to recover, the search system 100 may retrieve (e.g., fetch) the relevant byte range containing operations to recover. In some examples, the search system 100 may recover all of the translogs generation files relevant without flushing any interim index state to its location in the external object store 106. In some examples, the search system 100 may then perform an index recovery as it would for a recovery from a stateful restart, by replaying operations from the translog. In some examples, the search system 100 may flush the resulting files to the external object store 106 (e.g., thereby making a safe commit). The search system 100 may inform the master node that the recovery is complete, and the shard is started. In some examples, with respect to allocation optimization, the master node may attempt, for a node failover, to allocate multiple shards to a node at a time. In some examples, this may allow the target node to recover multiple translog files for different shards with single get operation from the external object store 106.

With respect to write fencing, an isolated indexing shard may continue to write new files even as a recovery is occurring on another node. In some examples, the search system 100 may address write fencing by forcing it to reach out to a master node before acknowledging. In some examples, the search system 100 may address write fencing by reading a lease file from the external object store 106. In some examples, the search system 100 may write a translog replica file and then learn from the master node or lease file or a combination that it is no longer the indexing shard and reject the operation. In some examples, the search system 100 may keep the translogs compressed in segments in memory. Potentially if data gets too large before a flush, the search system 100 may discard (e.g., drop) some of the data from memory and only fetch data from the external object store 106 if necessary.

In some examples, the system discussed herein may simplify operating and orchestrating a search and analytics engine because operating and orchestrating a stateless application may be simpler than a stateful application. In some examples, orchestrating stateful application is relatively difficult. For example, a stateful application may store a large amount of data and moving such large data amounts is not frictionless. However, by pushing the persistence responsibility to an external object store 106, the search and analytics engine may be no longer used to replicate data internally. In some examples, the system discussed herein may reduce costs by no longer requiring all data to be persisted on local disks (e.g., gigabytes of local disks can be used to search over and index terabytes of data). In some examples, the system herein may reduce costs by no longer replicating the indexing work and other work done when writing data to the search and analytics engine.

The search system 100 may include one or more processors and one or more memory devices. The processor(s) may be formed in a substrate configured to execute one or more machine executable instructions or pieces of software, firmware, or a combination thereof. The processor(s) can be semiconductor-based—that is, the processors can include semiconductor material that can perform digital logic. The memory device(s) may include a main memory that stores information in a format that can be read and/or executed by the processor(s). The memory device(s) may store the indexing tier 104 and the search tier 112, when executed by the processors, perform certain operations discussed herein. In some examples, the memory device(s) includes a non-transitory computer-readable medium that includes executable instructions that cause at least one processor to execute operations.

In some examples, the search system 100 may execute on one or more server computers. The client devices (e.g., client devices 102, client devices 114) may communicate with the search system 100 over a network. The server computer may be computing devices that take the form of a number of different devices, for example a standard server, a group of such servers, or a rack server system. In some examples, the server computer may be a single system sharing components such as processors and memories. The network may include the Internet and/or other types of data networks, such as a local area network (LAN), a wide area network (WAN), a cellular network, satellite network, or other types of data networks. The network may also include any number of computing devices (e.g., computers, servers, routers, network switches, etc.) that are configured to receive and/or transmit data within the network. Network may further include any number of hardwired and/or wireless connections.

The server computer(s) may include one or more processors formed in a substrate, an operating system (not shown) and one or more memory devices. The memory device(s) may represent any kind of (or multiple kinds of) memory (e.g., RAM, flash, cache, disk, tape, etc.). In some examples (not shown), the memory devices may include external storage, e.g., memory physically remote from but accessible by the server computer(s). The processor(s) may be formed in a substrate configured to execute one or more machine executable instructions or pieces of software, firmware, or a combination thereof. The processor(s) can be semiconductor-based—that is, the processors can include semiconductor material that can perform digital logic. The memory device(s) may store information in a format that can be read and/or executed by the processor(s). The memory device(s) include executable instructions, that, when executed by the processor(s), perform certain operations discussed herein (e.g., with respect to the indexing tier 104, the controller 120, the search tier 112, and/or the external object store 106).

In some examples, the search system 100 uses a text indexing and searching model. When one or more documents are indexed into the search system 100, in some examples, a document may not be immediately written to a disk (e.g., a local storage device 124). In some examples, the search system 100 may update its internal in-memory data structures. Once enough data accumulates or a refresh is triggered (e.g., receiving a refresh request), these documents are then written to disk, creating a new set of immutable files, which may be referred to as segments 152. In some examples, the indexed documents are not available for search until the segments 152 are written to disk (e.g., local storage device 124).

In some examples, the search system 100 may divide index structures 126 (e.g., indices) into multiple shards. A shard may include a primary shard and potentially multiple replica shards. In some examples, when a document is indexed, the document is first routed to the primary shard, where an indexing node 122 processes and indexes the document. After indexing on the primary shard, the document is then routed to the replica shards, where it is indexed by these copies. A refresh request is generated or used to make these indexed documents searchable. In some examples, in response to detection of a refresh request, the search system 100 may write the segments 152 to the local storage device 124. Refreshes may be scheduled periodically, with each indexing node 122 executing them at different times. This process may create distinct segment files on each indexing node 122, all containing the same set of documents.

Figure 2:
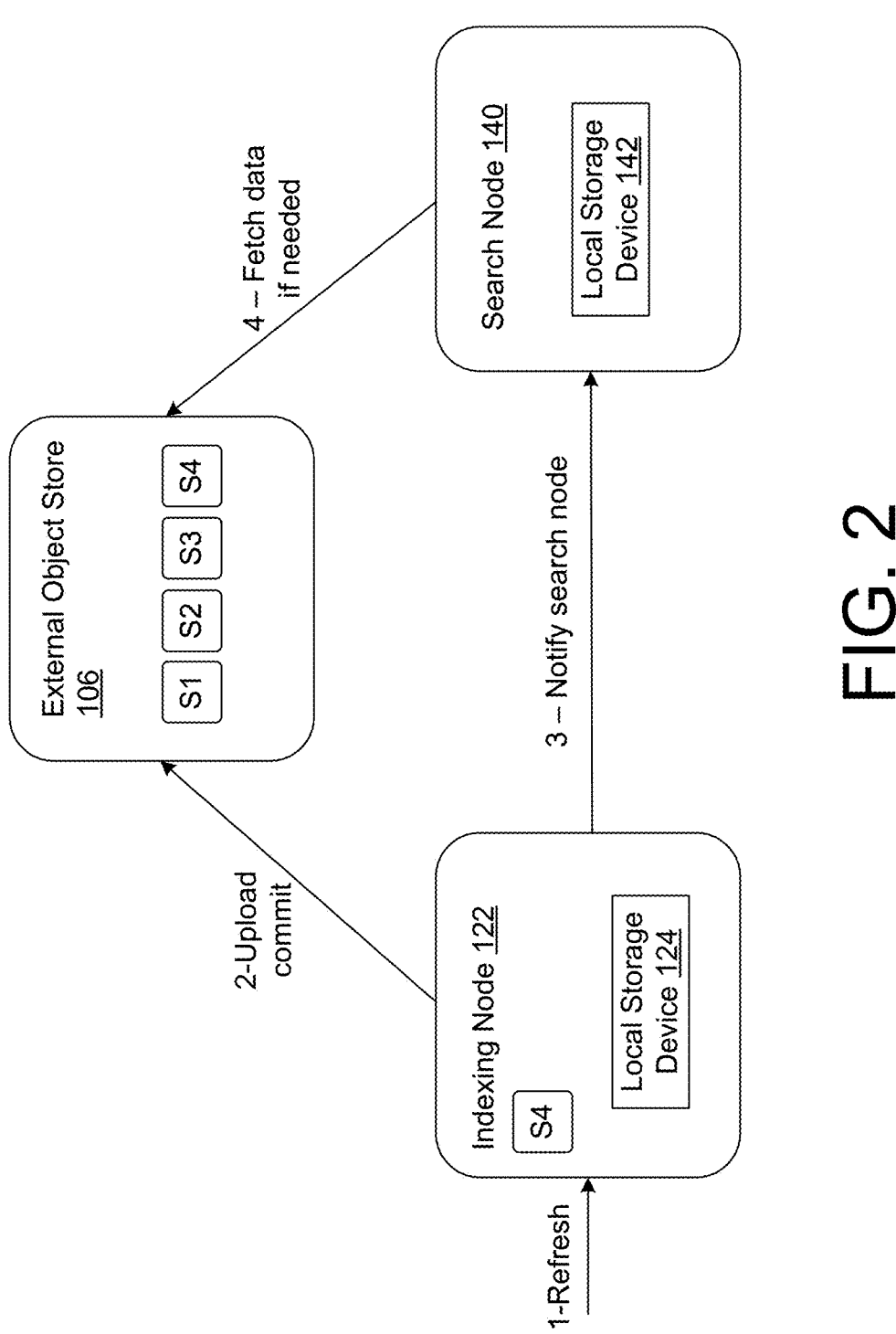
FIG. 2 illustrates a diagram depicting a transmission strategy for uploading segments to an external object store according to an aspect.

FIG. 2 illustrates a segment-based replication model according to an aspect. In some examples, one node per shard handles document indexing and generates one or more segments 152 (e.g., S4). In some examples, an indexing node 122 may detect a refresh request, and, in response to the refresh request being detected, the indexing node 122 may upload the segment 152 (e.g., S4). Subsequently, a search node 140 is informed about these new segments 152. In some examples, the search node 140 may read the new segments 152 from the external object store.

In some examples, the indexing node 122, where the documents were indexed, receives a refresh request and the search system 100 writes the in-memory data structures to the local storage device 124. Then, the segment(s) 152 are uploaded to the external object store 106 as a single file (e.g., a stateless compound commit) (e.g., S4). Once the segment (s) 152 are uploaded to the external object store 106, the indexing node 122 sends a message to each search node 140, notifying them of the new segment(s) 152 so they can perform searches on the newly indexed documents. The search nodes 140 may fetch the necessary data from the external object store 106 when executing searches. In some examples, this model offers the advantage of lightweight nodes, as data is stored in the external object store 106. This makes scaling or reallocating workloads between nodes more cost-effective compared to some conventional approaches, where data must be transferred to the new node containing the new shard.

In some examples, there are additional object store request costs associated with each refresh in the search system 100. Every refresh operation created a new object in the external object store 106, which may result in additional storage costs at the external object store 106. In some examples, the behavior of the refresh operations may lead to a linear relationship between the number of indices and the number of upload commits that result in increased costs. With enough refreshes, object store costs may surpass the cost of the hardware itself. To address this, the search system 100 may implement refresh throttling measures to manage costs effectively and mitigate potential issues over time.

Figure 3A:
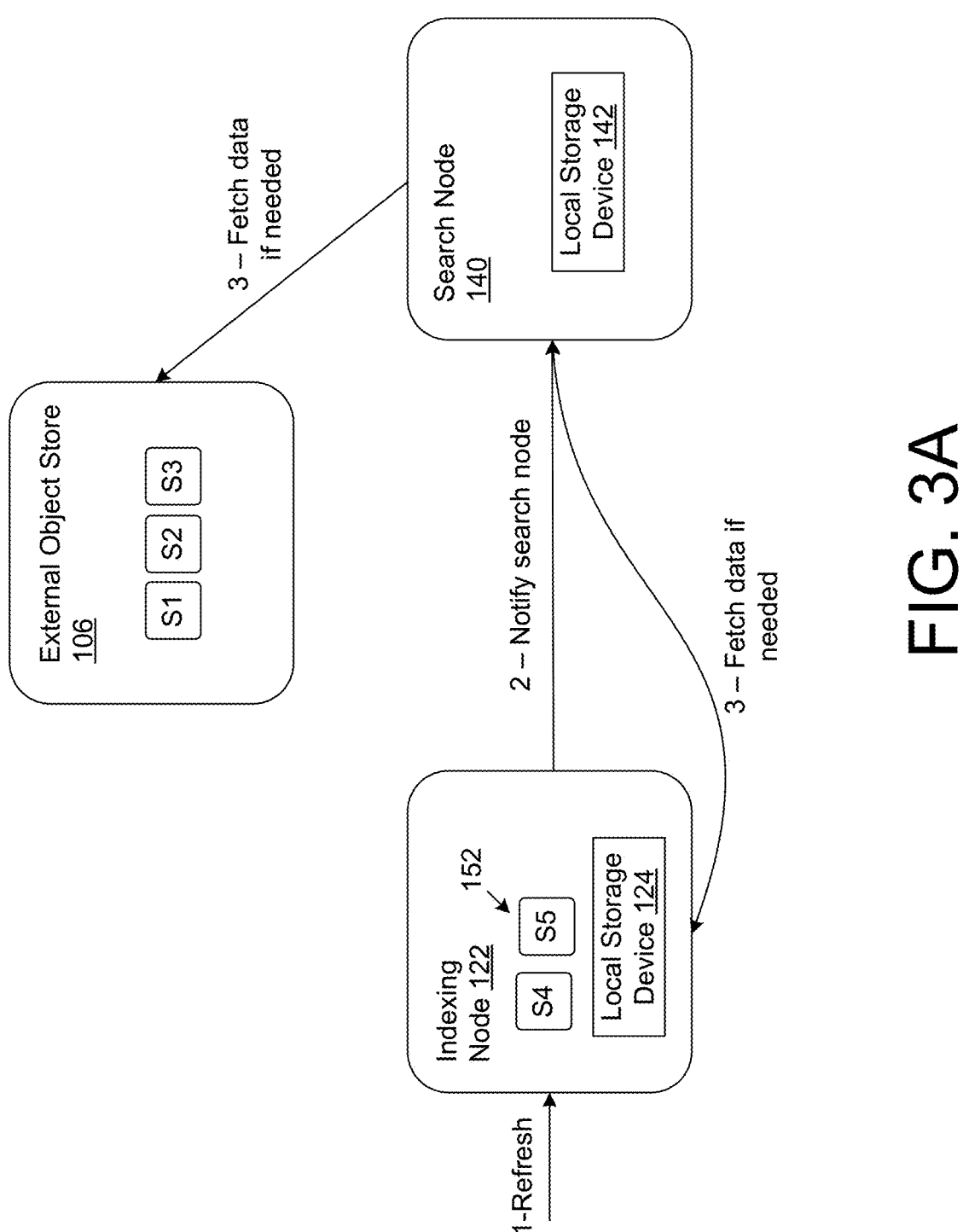
FIG. 3A illustrates a diagram depicting how a search node is notified of pending segments for uploading according to an aspect.
Figure 3B:
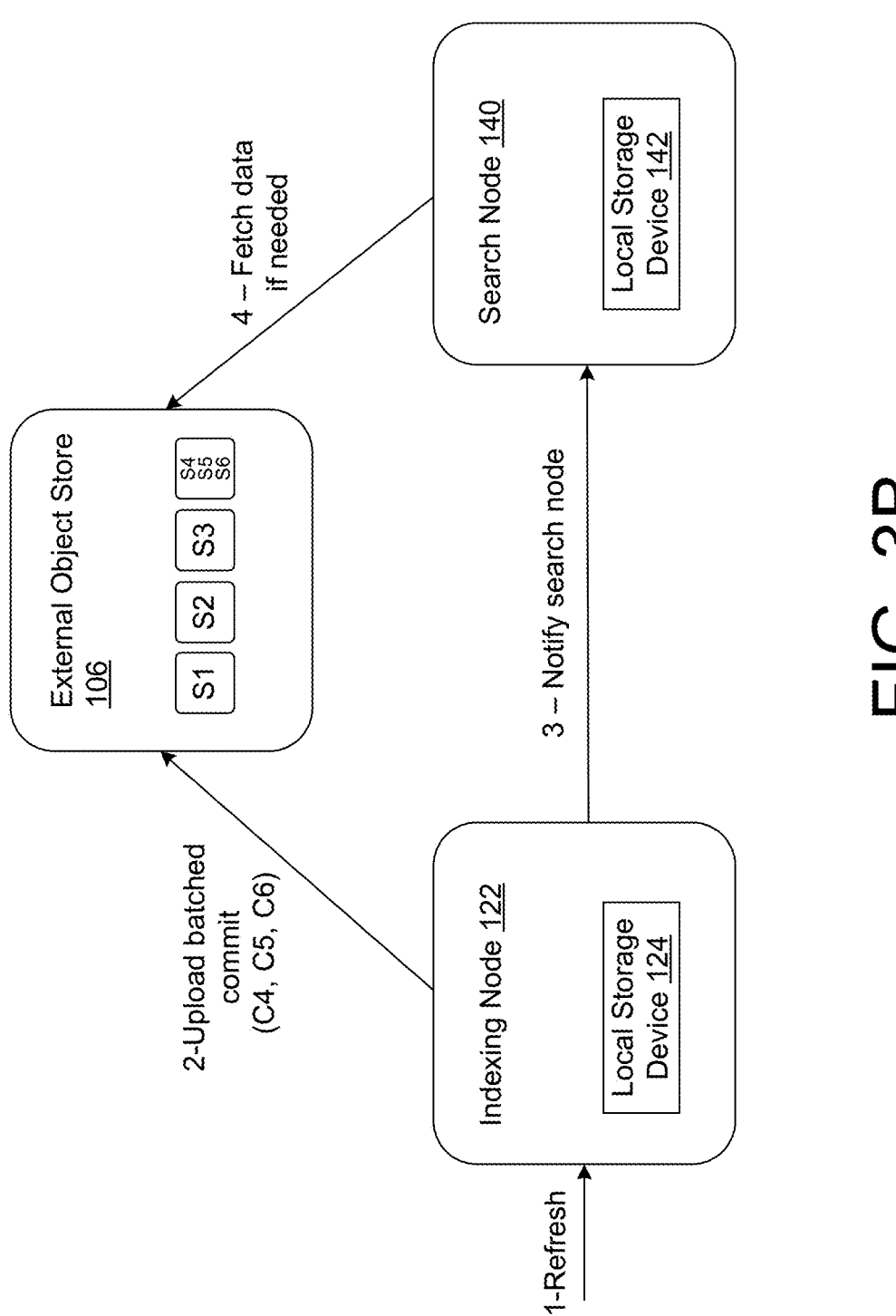
FIG. 3B illustrates a diagram depicting a transmission strategy for uploading segments to an external object store according to another aspect.
Figure 3C:
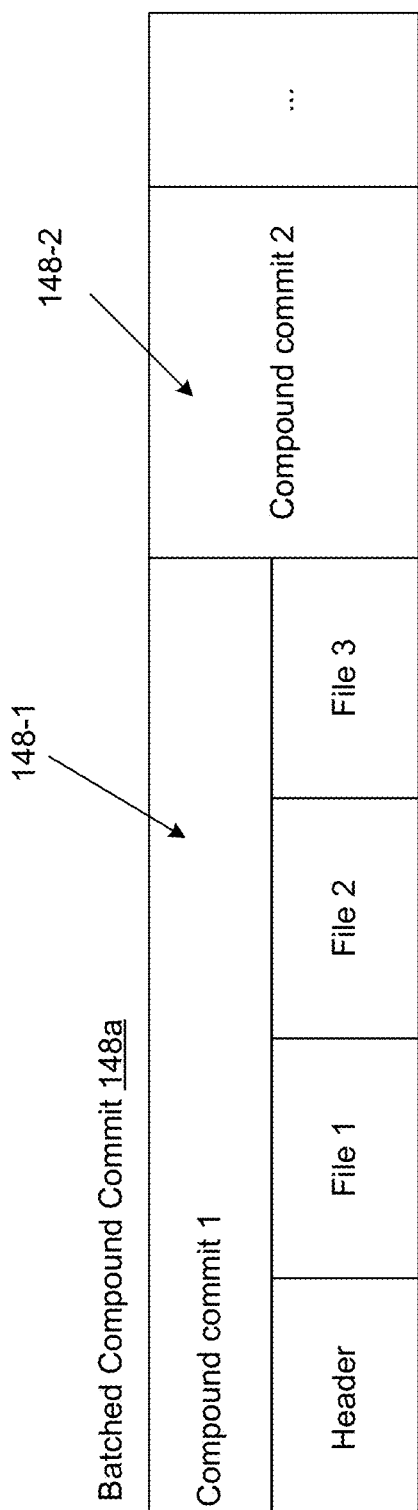
FIG. 3C illustrates an example of a batched compound commit for uploading to an external object store according to an aspect.

FIGS. 3A to 3C illustrate an aspect of the search system 100 that manages the transmission of segments 152 to the external object store 106 according to an aspect. A segment 152 may represent an update to an index structure 126. The search system 100 implements a refresh cost optimization technique (e.g., a transmission or upload strategy) that controls when segments 152 processed by an indexing node 122 are uploaded to the external object store 106. In some examples, the search system 100 may implement one or more throttling measures to control the uploading of index structure information to an external object store 106 to manage operational costs and mitigate potential issues over time. In some examples, instead of immediately uploading one or more new segments 152 to the external object store 106 in response to a refresh request, an indexing node 122 may accumulate segments 152 from one or more refresh request, and then upload the accumulated segments 152 as a batched compound commit 148a when one or more conditions are satisfied (e.g., they have a minimum size and/or a predetermined time interval elapses). This may enable indexing nodes 122 to serve reads from search nodes 140 in a manner similar to the external object store 106, and delaying segment uploads until sufficient data accumulates or a predetermined time interval elapses. In some examples, the search system 100 may control the size of commits 148 uploaded to the external object store 106, thereby reducing operational costs.

In some examples, an indexing node 122 may accumulate segments 152 from refresh requests until enough data is gathered to upload them as a single transmission. Referring to FIG. 3A, an indexing node 122 can receive a refresh request, and, in response to the refresh request, the indexing node 122 may write a new set of segments 152 (e.g., S4, S5) to a local storage device 124, and may add these segments 152 to a batched compound commit 148a for eventual upload. The indexing node 122 notifies the search node 140 about these new segments 152. For example, the indexing node 122 may transmit a message with details about the involved segments 152 (e.g., S4, S5) and their locations (e.g., the indexing node 122 or the external object store 106). When a search node 140 needs a segment 152 to fulfill a search query 111, the search node 140 may determine whether to retrieve the segment 152 from the external object store 106 or the indexing node 122 and caches the data locally (e.g., the local storage device 142).

FIG. 3B illustrates a process of uploading data to the external object store 106 once enough segments 152 have accumulated in the indexing node 122 or after a specified amount of time has elapsed. Referring to FIG. 3B, an indexing node 122 can receive one or more refresh requests, and, in response to a refresh request, the indexing node 122 may write a new set of segments 152 to a local storage device 124 and may add these segments 152 to a batched compound commit 148a for eventual upload. The indexing node 122 may determine whether accumulated segments 152 (e.g., S4, S5, S) have a size that is equal to or greater than a threshold level. In some examples, the indexing node 122 may determine whether the accumulated segments 152 are present in the indexing node 122 for greater than a threshold time interval. In response to the accumulated segments 152 being determined as present in the indexing node 122 for greater than the threshold time interval and/or the size of the accumulated segments 152 being determined as equal to or greater than the threshold level, the indexing node 122 may transmit the batched compound commit 148a to the external object store 106.

For example, a refresh request may add a new segment 152 to the batched compound commit 148a, and the accumulated data reaches a threshold level (e.g., 8 MB, 16 MB, 32 MB, etc.) or a certain amount of time has passed since the last refresh request, from this point onwards new segments 152 are accumulated into a new batched compound commit 148a. The indexing node 122 begins uploading the accumulated segments 152 as a single batched compound commit 148a to the external object store 106. The indexing node 122 notifies the search node replicas of the latest segment uploaded to the external object store 106, instructing them to fetch data from these segments 152 from the external object store 106 going forward.

If a search node 140 requires data that is not cached locally (e.g., in the local storage device 142), the search node 140 may retrieve the necessary information from the external object store 106, while any previously fetched data from the indexing node 122 remains valid even after the upload. As shown in FIG. 3C, a batched compound commit 148a includes one or more compound commits such as a compound commit 148-1 and a compound commit 148-2. The compound commit 148-1 may be added to the batched compound commit 148a in response to a first refresh request, and the compound commit 148-2 may be added to the batched compound commit 148a in response to a second refresh request. The compound commit 148-1 may include data about one or more segments 152 (e.g., S4, S5), and the compound commit 148-2 may include data about one or more segments 152 (e.g., S6). A compound commit may include a header and one or more files (e.g., file 1, file 2, file 3) (e.g., Lucene files).

FIG. 4 is a flowchart 400 depicting example operations of flowchart depicting example operations of a search system according to an aspect. The flowchart 400 may depict operations of a computer-implemented method. Although the flowchart 400 of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion.

Operation 402 includes generating, by an indexing tier, an index structure from a plurality of documents. Operation 404 includes storing, by the indexing tier, the index structure in a local storage device. Operation 406 includes transmitting, by the indexing tier, the index structure to an external object store, the external object store configured to store the index structure. Operation 408 includes receiving, by a search tier, a search query from a client device. Operation 410 includes communicating with the external object store or the indexing tier to retrieve at least a portion of the index structure to search data based on the search query.

Clause 1. A search system comprising: an indexing tier configured to: generate an index structure from a plurality of documents; store the index structure in a local storage device; and transmit the index structure to an external object store, the external object store configured to store the index structure; and a search tier configured to: receive a search query from a client device; and communicate with the external object store or the indexing tier to retrieve at least a portion of the index structure to search data based on the search query.

Clause 2. The search system of clause 1, wherein the indexing tier is configured to delete at least a portion of the index structure from the local storage device.

Clause 3. The search system of clause 1, wherein the indexing tier is configured to: receive a refresh request; in response to the refresh request being received, determine whether accumulated segments have a size that is equal to or greater than a threshold level; and in response to the size of the accumulated segments being determined as equal to or greater than the threshold level, transmit a batched compound commit to the external object store, the batched compound commit including the accumulated segments.

Clause 4. The search system of clause 3, wherein the indexing tier is configured to: in response to the refresh request being received, determine whether the accumulated segments are present in an indexing node for greater than a threshold time interval; and in response to the accumulated segments being determined as present in the indexing node for greater than the threshold time interval, transmit the batched compound commit to the external object store.

Clause 5. The search system of clause 1, wherein the indexing tier is configured to: generate an operation log based on indexing operations executed by the indexing tier; and transmit the operation log to the external object store for storage.

Clause 6. The search system of clause 5, wherein the indexing tier is configured to delete a portion of the operation log in the external object store.

Clause 7. The search system of clause 1, wherein the search tier is configured to retrieve a portion of the index structure from the external object store.

Clause 8. The search system of clause 1, further comprising: a controller configured to independently adjust computer resources associated with the search tier and computer resources associated with the indexing tier.

Clause 9. The search system of clause 1, wherein the indexing tier or the search tier is configured to delete a portion of the index structure at the external object store.

Clause 10. The search system of clause 9, wherein the indexing tier or the search tier is configured to execute at least one of an active deletion strategy or a garbage deletion strategy to delete the portion of the index structure in the external object store.

Clause 11. A non-transitory computer-readable medium storing executable instructions that when executed by at least one processor cause the at least one processor to execute operations, the operations comprising: generating, by an indexing tier, an index structure from a plurality of documents; storing, by the indexing tier, the index structure in a local storage device; transmitting, by the indexing tier, the index structure to an external object store, the external object store configured to store the index structure; receiving, by a search tier, a search query from a client device; and communicating with the external object store or the indexing tier to retrieve at least a portion of the index structure to search data based on the search query.

Clause 12. The non-transitory computer-readable medium of clause 11, wherein the operations further comprise: receiving, by the indexing tier, a refresh request; in response to the refresh request being received, determining whether accumulated segments have a size that is equal to or greater than a threshold level; and in response to the size of the accumulated segments being determined as equal to or greater than the threshold level, transmitting, by the indexing tier, a batched compound commit to the external object store, the batched compound commit including the accumulated segments.

Clause 13. The non-transitory computer-readable medium of clause 12, wherein the operations further comprise: in response to the refresh request being received, determining whether the accumulated segments are present in an indexing node for greater than a threshold time interval; and in response to the accumulated segments being determined as present in the indexing node for greater than the threshold time interval, transmitting, by the indexing tier, the batched compound commit to the external object store.

Clause 14. The non-transitory computer-readable medium of clause 11, wherein the operations further comprise: generating an operation log based on indexing operations executed by the indexing tier; and transmitting, by the indexing tier, the operation log to the external object store for storage.

Clause 15. The non-transitory computer-readable medium of clause 14, wherein the operations further comprise: deleting a portion of the operation log in the external object store.

Clause 16. The non-transitory computer-readable medium of clause 11, wherein the operations further comprise: retrieving, by the search tier, a portion of the index structure from the external object store.

Clause 17. The non-transitory computer-readable medium of clause 11, wherein the operations further comprise: independently adjusting computer resources associated with the search tier and computer resources associated with the indexing tier.

Clause 18. A method comprising: generating, by an indexing tier, an index structure from a plurality of documents; storing, by the indexing tier, the index structure in a local storage device; transmitting, by the indexing tier, the index structure to an external object store, the external object store configured to store the index structure; receiving, by a search tier, a search query from a client device; and communicating with the external object store or the indexing tier to retrieve at least a portion of the index structure to search data based on the search query.

Clause 19. The method of clause 18, further comprising: receiving, by the indexing tier, a refresh request; in response to the refresh request being received, determining whether accumulated segments have a size that is equal to or greater than a threshold level; and in response to the size of the accumulated segments being determined as equal to or greater than the threshold level, transmitting, by the indexing tier, a batched compound commit to the external object store, the batched compound commit including the accumulated segments.

Clause 20. The method of clause 19, further comprising: in response to the refresh request being received, determining whether the accumulated segments are present in an indexing node for greater than a threshold time interval; and in response to the accumulated segments being determined as present in the indexing node for greater than the threshold time interval, transmitting, by the indexing tier, the batched compound commit to the external object store.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., an OLED (Organic light emitting diode) or LCD (liquid crystal display) monitor) for displaying information to the user and a keyboard and a pointing device (e.g., a mouse or a trackball) by which the user can provide input to the computer. Alternatively, this can be implemented with a 3D user interaction system making use of trackers that are tracked in orientation and 3D position. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship with each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art. Moreover, use of terms such as up, down, top, bottom, side, end, front, back, etc. herein are used with reference to a currently considered or illustrated orientation. If they are considered with respect to another orientation, it should be understood that such terms must be correspondingly modified.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A search system comprising:
at least one processor; and
at least one memory device storing executable instructions that cause the at least one processor to execute:
an indexing tier configured to:
generate a segment of an index structure based on data received from at least one first computing device;
store the segment in a local storage device associated with the indexing tier; and
transmit the segment to an external object store for storage thereon; and
a search tier configured to:
receive a search query from a second computing device;
retrieve at least a portion of the segment from the external object store; and
execute the search query using at least the portion of the segment.

2. The search system of claim 1, wherein the indexing tier is configured to:
in response to the segment being transmitted to the external object store, delete the segment from the local storage device.

3. The search system of claim 1, wherein the indexing tier is configured to:
determine whether a size of a plurality of segments stored in the local storage device satisfy a threshold level, the plurality of segments including the segment; and
in response to the size being determined as satisfying the threshold level, transmit a batched payload to the external object store, the batched payload including the plurality of segments.

4. The search system of claim 1, wherein the indexing tier is configured to:
determine whether a plurality of segments are stored in the local storage device for a period of time that satisfies a threshold time interval, the plurality of segments including the segment; and
in response to the period of time being determined as satisfying the threshold time interval, transmit a batched payload to the external object store, the batched payload including the plurality of segments.

5. The search system of claim 1, wherein the indexing tier is configured to:
in response to receiving the data from the at least one first computing device, generate a transaction record identifying a change to be made to the index structure;
in advance of the segment being generated, transmit the transaction record to the external object store for storage thereon;
in response to a restart event or a failure event, retrieve the transaction record from the external object store; and generate the segment of the index structure using the transaction record.

6. The search system of claim 5, wherein the indexing tier is configured to:
initiate deletion of the transaction record from the external object store in response to a determination that the segment has been stored in the external object store and the segment includes the change identified in the transaction record.

7. The search system of claim 1, wherein the executable instructions include instructions that cause the at least one processor to execute:
a controller configured to:
monitor a first volume of the data received by the indexing tier and a second volume of search queries received by the search tier;
in response to the first volume satisfying a first threshold level, adjust a number of indexing nodes of the indexing tier; and
in response to the second volume satisfying a second threshold level, adjust a number of search nodes of the search tier.

8. The search system of claim 1, wherein the segment is a first segment, wherein the indexing tier is configured to:
identify a second segment in the external object store that is not referenced by an index manifest representing a searchable state of the index structure; and
initiate deletion of the second segment from the external object store.

9. The search system of claim 8, wherein the indexing tier is configured to:
identify a set of active searchers associated with the search tier; and
in response to a determination that the second segment is not accessed by the set of active searchers, initiate deletion of the second segment from the external object store.

10. The search system of claim 1, wherein the local storage device associated with the indexing tier is a first local storage device, wherein the search query is a first search query, wherein the search tier is configured to:
in response to the portion of the segment being retrieved from the external object store, store the portion of the segment in a second local storage device associated with the search tier;
receive a second search query;
retrieve the portion of the segment from the second local storage device; and
execute the second search query using at least the portion of the segment.

11. The search system of claim 1, wherein the local storage device associated with the indexing tier is a first local storage device, the segment is a first segment, and the search query is a first search query, wherein the search tier is configured to:
identify a pattern of segment access by analyzing a plurality of search queries;
identify a second segment of the index structure based on the pattern of segment access;
retrieve the second segment from the external object store; and
in advance of receiving a second search query that uses the second segment, store the second segment in a second local storage device associated with the search tier.

12. A non-transitory computer-readable medium storing executable instructions that when executed by at least one processor cause the at least one processor to execute operations, the operations comprising:

generating a segment of an index structure based on data received from at least one first computing device;

storing the segment in a local storage device associated with an indexing tier;

transmitting the segment to an external object store for storage thereon;

receiving a search query from a second computing device;

retrieving at least a portion of the segment from the external object store; and executing the search query using at least the portion of the segment.

13. The non-transitory computer-readable medium of claim 12, wherein the operations further comprise:

determining whether a size of a plurality of segments stored in the local storage device satisfy a threshold level, the plurality of segments including the segment;

determining whether the plurality of segments are stored in the local storage device for a period of time that satisfies a threshold time interval; and in response to the size being determined as satisfying the threshold level and the period of time being determined as satisfying the threshold time interval, transmitting, a batched payload to the external object store, the batched payload including the plurality of segments.

14. The non-transitory computer-readable medium of claim 12, wherein the operations further comprise:

in response to receiving the data from the at least one first computing device, generating a transaction record identifying a change to be made to the index structure;

in advance of generating the segment, transmitting the transaction record to the external object store for storage thereon;

in response to a restart event or a failure event, retrieving the transaction record from the external object store; and generating the segment of the index structure using the transaction record.

15. The non-transitory computer-readable medium of claim 14, wherein the operations further comprise:

initiating deletion of the transaction record from the external object store in response to a determination that the segment has been stored in the external object store and the segment includes the change identified in the transaction record.

16. The non-transitory computer-readable medium of claim 12, wherein the operations further comprise:

in response to the segment being transmitted to the external object store, deleting the segment from the local storage device.

17. A method comprising:

generating a segment of an index structure based on data received from at least one first computing device;

storing the segment in a first local storage device associated with an indexing tier;

transmitting the segment to an external object store for storage thereon;

receiving a search query from a second computing device;

determining whether the segment is stored in a second local storage device associated with a search tier, the second local storage device configured to store one or more segments previously retrieved by the search tier;

in response to the segment being determined as not stored in the second local storage device, retrieving at least a portion of the segment from the external object store; and executing the search query using at least the portion of the segment.

18. The method of claim 17, further comprising:

determining whether a size of a plurality of segments stored in the first local storage device satisfy a threshold level, the plurality of segments including the segment;

determining whether the plurality of segments are stored in the first local storage device for a period of time that satisfies a threshold time interval; and in response to the size being determined as satisfying the threshold level and the period of time being determined as satisfying the threshold time interval, transmitting a batched payload to the external object store, the batched payload including the plurality of segments.

19. The method of claim 17, further comprising:

storing the segment in the second local storage device; and deleting the segment from the second local storage device in response to an access frequency of the segment satisfying a threshold condition.

20. The method of claim 17, further comprising:

identifying a plurality of segments stored in the external object store that satisfy a merge threshold;

retrieving the plurality of segments from the external object store;

merging the plurality of segments into a consolidated segment;

transmitting the consolidated segment to the external object store; and updating an index manifest to reference the consolidated segment instead of the plurality of segments.

* * * * *